(12) United States Patent
Kelly et al.

(10) Patent No.: US 12,264,668 B2
(45) Date of Patent: Apr. 1, 2025

(54) FLAPPER VALVE WITH COMMON ROTATIONAL DIRECTION

(71) Applicant: Hamilton Sundstrand Corporation, Charlotte, NC (US)

(72) Inventors: Myles Kelly, Willimantic, CT (US); Andrew J. Thompson, Ellington, CT (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 0 days.

(21) Appl. No.: 18/345,582

(22) Filed: Jun. 30, 2023

(65) Prior Publication Data
US 2025/0003403 A1    Jan. 2, 2025

(51) Int. Cl.
  *F04B 53/10* (2006.01)
  *F01D 17/14* (2006.01)
  *F16K 15/03* (2006.01)

(52) U.S. Cl.
  CPC ........ *F04B 53/1045* (2013.01); *F01D 17/148* (2013.01); *F16K 15/036* (2013.01)

(58) Field of Classification Search
  CPC ........ F01D 17/145; F01D 17/148; F02C 6/08; F04B 53/1045; F16K 15/036
  See application file for complete search history.

(56) References Cited

U.S. PATENT DOCUMENTS

| | | | |
|---|---|---|---|
| 3,933,173 A | 1/1976 | Kajita | |
| 6,273,136 B1 | 8/2001 | Steinert et al. | |
| 6,796,327 B2 | 9/2004 | Bodnar | |
| 10,088,065 B2 | 10/2018 | Olejak | |
| 10,344,882 B2 | 7/2019 | Skorupa | |
| 10,539,244 B2 | 1/2020 | Solarz et al. | |
| 10,683,812 B2 | 6/2020 | Clauson et al. | |
| 11,112,023 B2 | 9/2021 | Ostrowski et al. | |
| 2008/0078459 A1 | 4/2008 | Warriner et al. | |
| 2011/0259550 A1* | 10/2011 | Komaba | F16K 15/035 137/527 |
| 2017/0363003 A1 | 12/2017 | Evetts et al. | |

FOREIGN PATENT DOCUMENTS

| | | | | |
|---|---|---|---|---|
| CN | 104405935 A | * | 3/2015 | ............... F16K 1/36 |
| CN | 206496046 U | | 9/2017 | |
| CN | 112096884 A | | 12/2020 | |
| CN | 113483127 A | * | 10/2021 | |
| CN | 113531175 A | * | 10/2021 | |
| CN | 114151585 A | * | 3/2022 | |
| DE | 1806409 A1 | * | 9/1969 | |
| DE | 2715345 A1 | * | 10/1978 | |
| EP | 2669443 A1 | * | 12/2013 | ............... E04B 1/98 |
| KR | 200171953 Y1 | * | 3/2000 | |

OTHER PUBLICATIONS

European Search Report for EP Application No. 24185721.8 dated Nov. 12, 2024.

* cited by examiner

*Primary Examiner* — Marina A Tietjen
(74) *Attorney, Agent, or Firm* — Carlson, Gaskey & Olds, P.C.

(57) ABSTRACT

A flapper check valve includes a valve seat body. Two flapper valve portions are each mounted on their own shaft to the valve seat body, and pivotable between open and closed positions. The flapper valve portions pivot in a common rotational direction to the open position and to the closed position. A fluid systems is also disclosed.

13 Claims, 3 Drawing Sheets

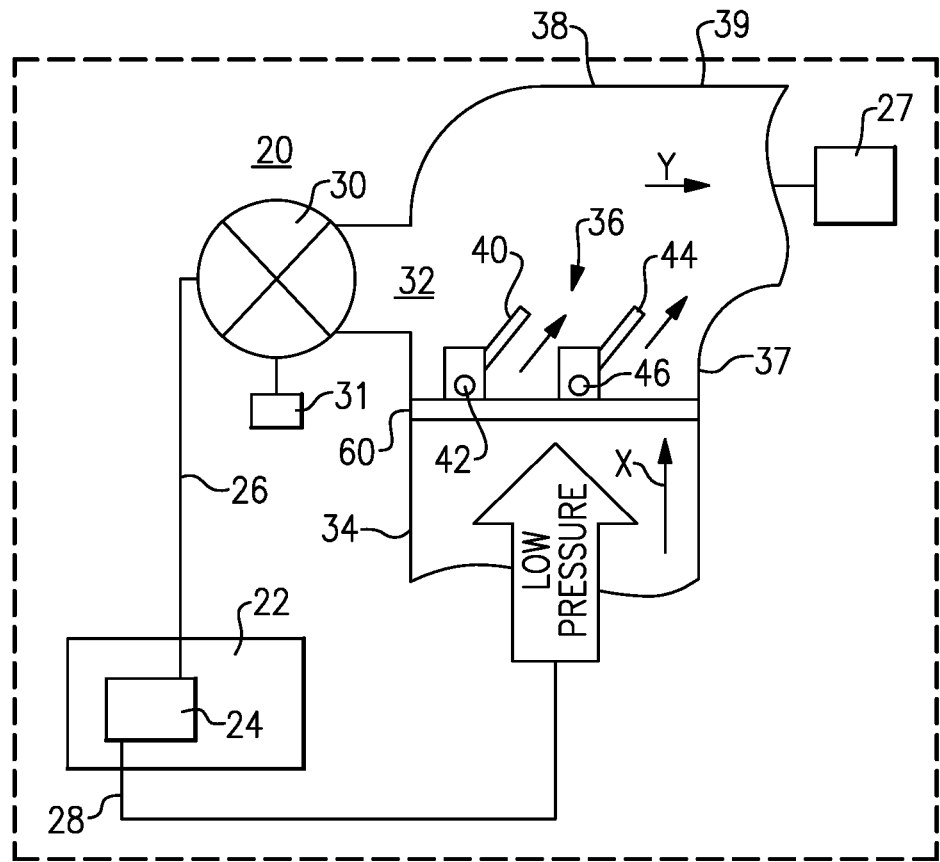
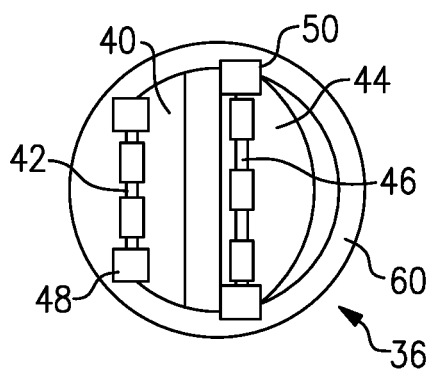
FIG.1B
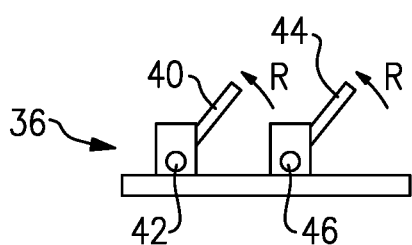
FIG.1C
FIG.1A

FLAPPER VALVE WITH COMMON ROTATIONAL DIRECTION

BACKGROUND

This application relates to a flapper check valve wherein the two flapper valve members rotate in a common direction between open and closed positions.

Check valves are used in any number of applications. One type of check valve is a so called flapper valve.

In a typical flapper valve there are two valve members each mounted to pivot about a pivot axis.

As one example system, in many aerospace applications there is a high pressure source delivered to a use and an alternative lower pressure source. The high pressure source passes through a valve which may be electronically commanded closed at higher power operation. When the high pressure source is being delivered to the use it maintains a check valve closed so the low pressure source does not reach the use.

However, at high power operation the low pressure source will be at a sufficiently high enough pressure that it may be delivered to the use. In such a case the valve on the high pressure source is electronically commanded closed and the low pressure source air can pass through the flapper valve to the use.

Known flapper valves have two pivoting flapper valve portions which pivot in opposed rotational directions. Such flapper valves may have challenges if turbulent airflow reaches the check valve. Moreover, there may be dithering, or challenges with returning to a closed position.

SUMMARY

A flapper check valve includes a valve seat body. Two flapper valve portions are each mounted on their own shaft to the valve seat body, and move between open and closed positions. The flapper valve portions pivot in a common rotational direction to the open position and to the closed position.

These and other features will be best understood from the following drawings and specification, the following is a brief description.

BRIEF DESCRIPTION OF THE DRAWINGS

FIG. 1A schematically shows an aircraft with an associated system.

FIG. 1B shows a flapper valve from the FIG. 1A system in an open position.

FIG. 1C shows a feature of the FIGS. 1A and 1B flapper valve.

DETAILED DESCRIPTION

Figure 2A:
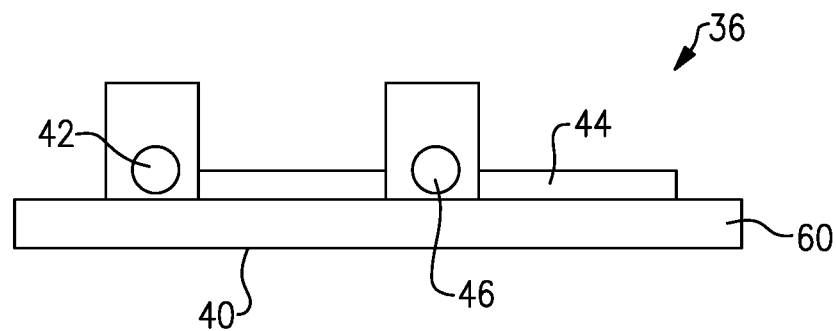
FIG. 2A shows the flapper valve in a closed position.

FIG. 1A schematically shows an aircraft 20 receiving a gas turbine engine 22. Gas turbine engine 22 includes a compressor 24. A first air tap 26 taps higher pressure air from the compressor 24 to be selectively delivered to a use 27 on the aircraft 20. The use 27 could be an environmental control system for the aircraft, cooling air for a bearing on the gas turbine engine 22, or any number of other applications. A second tap 28 is shown tapped from the compressor 24 at what will be a lower pressure location in the compressor 24.

Air from the higher pressure tap 26 passes through a selectively opened valve 30 downstream into a chamber 32, and then through a duct 38 to the use 27. A control 31 is schematically shown controlling the valve 30. Control 31 may be an electronic control such a full authority digital electric controller ("FADEC") or could be a dedicated control.

The low pressure air 28 is delivered into a duct 34. A check valve 36 is placed on the duct 34 and blocks the low pressure air from reaching the chamber 32 when higher pressure air is delivered through valve 30 into the chamber 32.

However, at high power operation of the gas turbine engine 22 the lower pressure tap 28 may be at a sufficiently high pressure to meet the needs of the use 27. In such a case, the valve 30 is closed such that the lower pressure air from tap 28 can move through the check valve 36 into the chamber 32. This improves the efficiency of the gas turbine engine 22 operation.

As shown, the check valve 36 includes two pivoting flapper valve portions 40 and 44. Flapper valve portion 40 pivots on the shaft 42 and flapper valve portion 44 pivots on the shaft 46.

As shown in FIG. 1B, the arrangement is such that the shaft 42 is on an opposed side of the flapper valve portion 40 from the shaft 46 of the flapper valve portion 44. Stops 48 and 50 are shown respectively.

Thus, it could be said in this arrangement in one direction there is a shaft, a flapper valve portion, a second shaft and then a second flapper valve portion.

As shown in FIG. 1C, with such an arrangement the flapper valve portions 40 and 44 rotate in a common rotational direction R when pivoting to the open position.

Returning to FIG. 1A, as can be appreciated, the position of the flap members 40 and 44 guide the air toward a downstream portion 39 of the duct 38. A valve seat body 60 mounts the flapper valve portions.

As shown, the air initially entering the chamber 32 is within a duct portion 37 which extends generally along a first direction X. The duct section 39 extends along a direction Y. In the disclosed embodiment direction Y is generally perpendicular to direction X, thus defining an effective 90 degree turn. In embodiments direction Y will have at least a component in a direction which is perpendicular to the direction X. As shown by arrows here, the position of the flapper valve portions 40 and 44 serve to direct the airflow from the direction X to the direction Y.

This arrangement is more capable of handling turbulent flow than the prior art.

FIG. 2A is a view of the flapper valve 36 in a closed portion. Flapper valve portions 40 and 44 have both pivoted in the rotational direction opposite of R to the closed position.

Figure 2B:
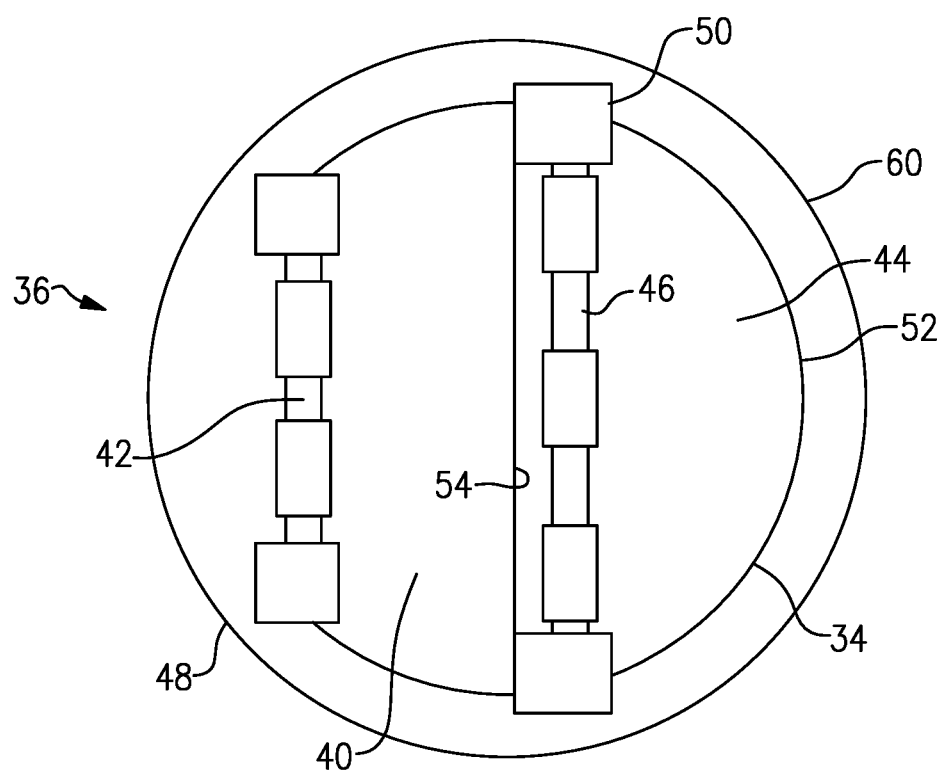
FIG. 2B also shows the flapper valve in a closed position.

FIG. 2B shows the valve 36 in the closed position. As can be appreciated, in this embodiment since the duct 34 is cylindrical the combination of the flapper valve members 40 and 44 generally provides a cylindrical shape. Thus, the one flapper valve portion 40 has a forward face 54 which is generally straight. The opposed flapper valve portion 44 has an end 52 remote from its shaft 46 which is part cylindrical.

In the FIGS. 1A, 1B, 2A and 2B, the shafts 42 and 46 are generally at one end of the flapper valve portions 40 and 44.

Figure 3A:
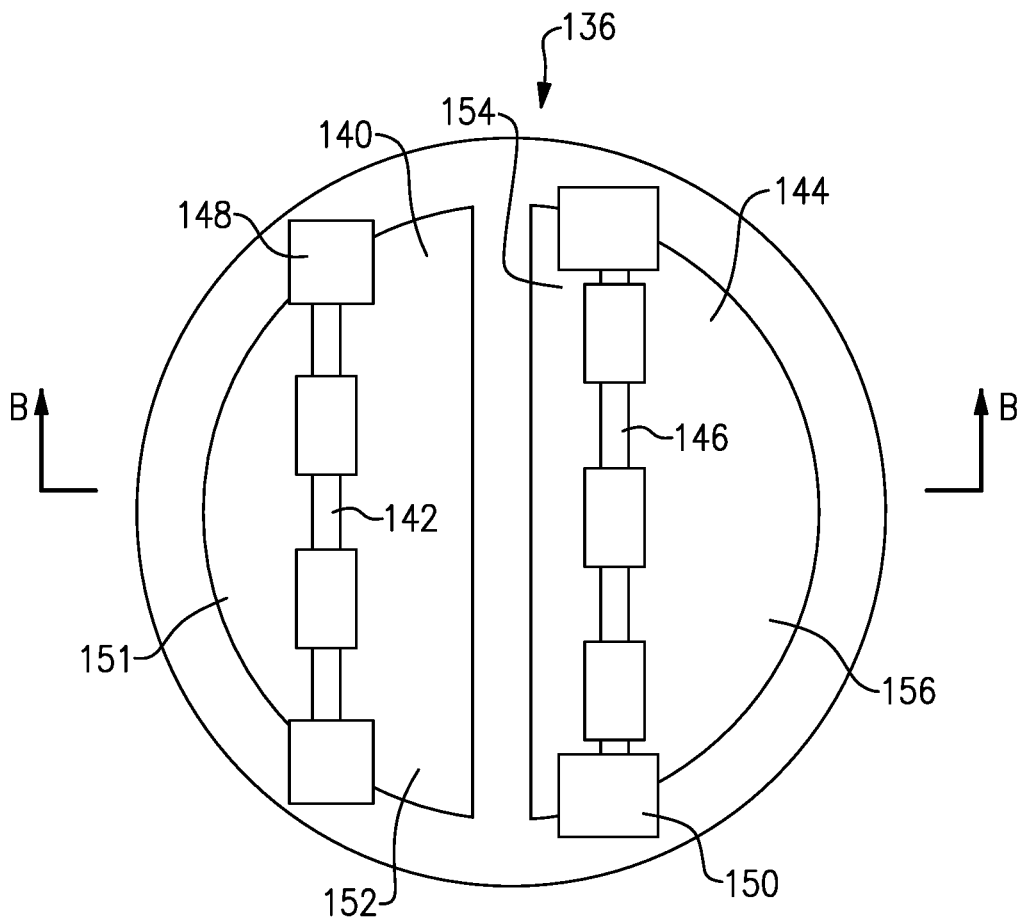
FIG. 3A shows an alternative embodiment flapper valve.

FIG. 3A shows an embodiment 136 where the shafts 142 and 146 are at an intermediate location. Thus, the flapper valve portion 140 has one end 151 on one side of the shaft 142 and the opposed end 152 on the other side of the shaft 146. Similarly, the flapper valve portion 144 has an end 154 on one side of the shaft 146 and an opposed end 156 on the other side of the shaft 146.

Figure 3B:
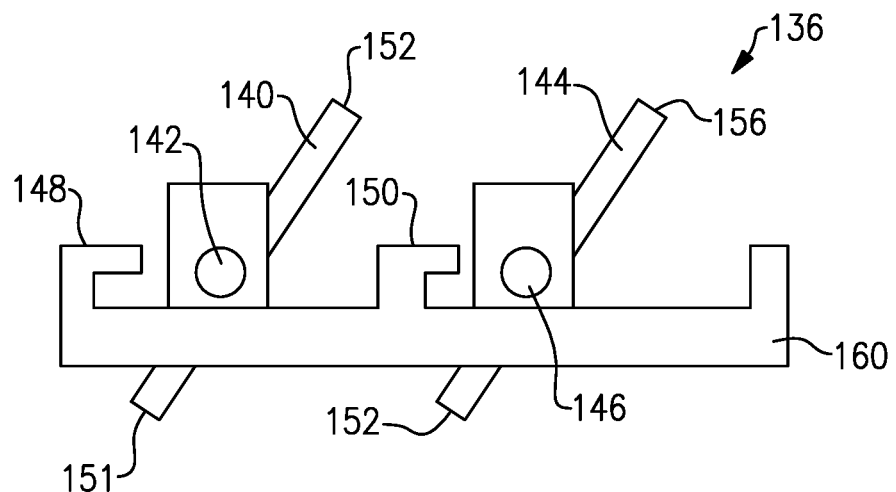
FIG. 3B shows the alternative embodiment flapper valve in an open position.

Now, as shown in FIG. 3B, when the flapper valve portions 140 and 144 pivot to the open position the ends 151 and 152 are one side below a plane of valve seat body 160 whereas the ends 152 and 156 are on an opposed side above the valve seat body 160. Valve stops 148 and 150 are shown for stopping rotation of the valve portions 140 and 144 in the closed position.

A flapper check valve under this disclosure could be said to include a valve seat body. Two flapper valve portions are each mounted on their own shaft to the valve seat body, and pivotable between open and closed positions. The flapper valve portions pivot in a common rotational direction to the open position and to the closed position.

A fluid system under this disclosure could be said to include a compressor, a high pressure tap from the compressor section and a low pressure tap. The high pressure tap is connected to a selectively closed and opened valve and into a chamber. The low pressure tap passes into a low pressure duct, and then to a flapper check valve. A control for the control valve is programmed selectively opens and closes the control valve to provide the higher pressure air into the chamber. The check valve blocks the lower pressure tap from entering the chamber when the higher pressure air is delivered into the chamber, with the flapper check valve being allowed to open and deliver the lower pressure air into the chamber valve housing when the control valve is closed. The flapper check valve has a valve seat body, two flapper valve portions each mounted on their own shaft to the valve seat body, and pivotable between open and closed positions, with the flapper valve portions pivoting in a common rotational direction to the open position and to the closed position.

Although embodiment have been disclosed, a worker of skill in this art would recognize that certain modifications would come within the scope of this disclosure. For that reason the following claims should be studied to determine the true scope and content of this disclosure.

What is claimed is:

1. A flapper check valve comprising:
   a valve seat body;
   two flapper valve portions each mounted on their own shaft to the valve seat body, and pivotable between open and closed positions, with said flapper valve portions pivoting in a common rotational direction to the open position and to the closed position;
   wherein a forward face at a first of the flapper valve portion facing a second of the flapper valve portions is straight and a forward face of the second of the flapper valve portions facing away from the first of the flapper valve portion is cylindrical; and
   wherein the shafts of the flapper valve portions are at an intermediate location in each of the flapper valve portions such that when in the open position, one end of each of the flapper valve portions is above the valve seat body and an opposed end of each of the flapper valve portions has pivoted in the common direction to be below the valve seat body.

2. A fluid system comprising:
   a compressor, a high pressure tap from the compressor section and a low pressure tap, the high pressure tap connected to a selectively closed and opened valve and into a chamber;
   the low pressure tap passing into a low pressure duct, and then to a flapper check valve, with a control for the control valve programmed to selectively opens and closes the control valve to provide the higher pressure air into the chamber, and the flapper check valve blocking the lower pressure tap from entering the chamber when the higher pressure air is delivered into the chamber, with the flapper check valve being allowed to open and deliver the lower pressure air into the chamber valve housing when the control valve is closed; and
   the flapper check valve having a valve seat body, two flapper valve portions each mounted on their own shaft to the valve seat body, and pivotable between open and closed positions, with said flapper valve portions pivoting in a common rotational direction to the open position and to the closed position.

3. The fluid system as set forth in claim 2, wherein the shaft for one of the flapper valve portions is on an opposed side of the one of the flapper valve portion relative to the shaft of the other of the flapper valve portions, and the other of the flapper valve portions is on an opposed side of its shaft relative to the first of the flapper valve portions.

4. The fluid system as set forth in claim 3, wherein stops are provided to limit the movement of the first and second flapper valve portions.

5. The fluid system as set forth in claim 4, wherein the shafts of the first and second flapper valve portions are at ends of the flapper valve portions.

6. The fluid system as set forth in claim 4, wherein the shafts of the flapper valve portions are at an intermediate location in each of the flapper valve portions such that when in the open position, one end of each of the flapper valve portions is above the valve seat body and an opposed end of each of the flapper valve portions has pivoted in the common direction to be below the valve seat body.

7. The fluid system as set forth in claim 2, wherein a forward face at a first of the flapper valve portion facing a second of the flapper valve portions is straight and a forward face of the second of the flapper valve portions facing away from the first of the flapper valve portion is cylindrical.

8. The fluid system as set forth in claim 2, wherein the shafts of the first and second flapper valve portions are at ends of the flapper valve portions.

9. The fluid system as set forth in claim 2, wherein the shafts of the flapper valve portions are at an intermediate location in each of the flapper valve portions such that when in the open position, one end of each of the flapper valve portions is above the valve seat body and an opposed end of each of the flapper valve portions has pivoted in the common direction to be below the valve seat body.

10. The fluid system as set forth in claim 2, wherein the chamber is connected to deliver compressed air to a use.

11. The fluid system as set forth in claim 10, wherein the use is on an aircraft.

12. The fluid system as set forth in claim 10, wherein the low pressure duct delivering air to the flapper check valve extends along a first direction, and air entering the chamber and passing downstream toward the use moving through a duct portion extending along a second direction having at least a component perpendicular to the first direction, and the flapper valve portions in the open position guiding air from the first direction and to the second direction.

13. The fluid system as set forth in claim 12, wherein the second direction is perpendicular to the first direction.

* * * * *